April 6, 1943. G. E. FORD 2,315,779
THERMOMETER
Filed May 15, 1941 2 Sheets-Sheet 2
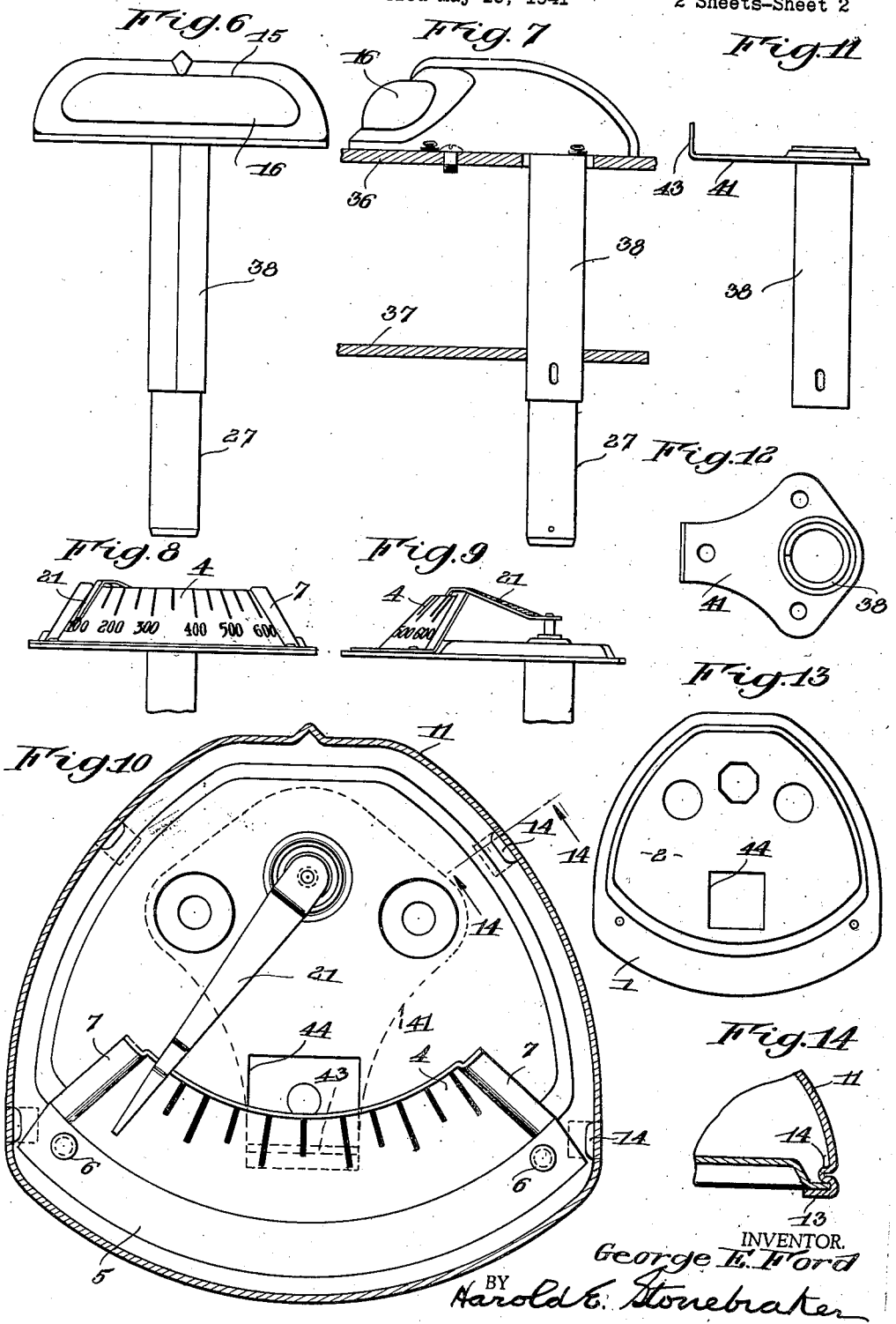
INVENTOR.
George E. Ford
BY Harold E. Stonebraker
his ATTORNEY.

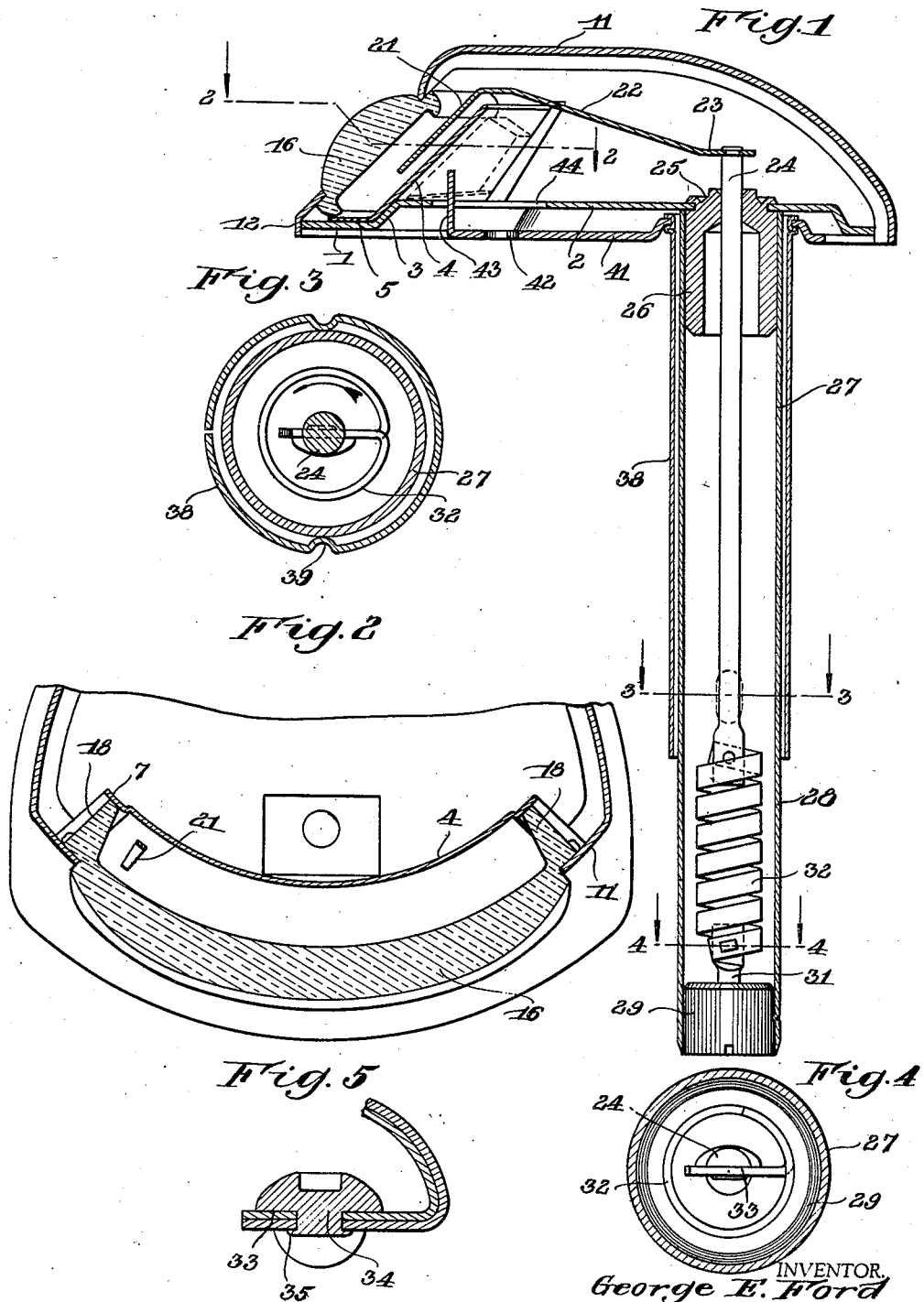

Patented Apr. 6, 1943

2,315,779

UNITED STATES PATENT OFFICE 2,315,779

THERMOMETER

George E. Ford, Rochester, N. Y., assignor to Rochester Manufacturing Co., Inc., Rochester, N. Y., a corporation of New York Application May 15, 1941, Serial No. 393,612

4 Claims. (Cl. 73—367)

This invention relates to improvements in thermometers, with more particular reference to the type of instrument that employs a bimetallic temperature responsive element, and it has for its purpose to provide a structure that is efficient and accurate, which can be economically manufactured, and is of universal application by merely changing the location and connection of the temperature responsive element.

In a more specific aspect, the invention is primarily designed to afford a practical and low cost stove thermometer constructed in such a manner that it can be readily applied either to the top, side wall, or oven door of a range, the indicator and scale being easily read in any position.

Another purpose of the invention is to reduce the cost of manufacture, and simplify the application of the thermometer to different relationships and positions by forming an indicating dial or scale separate from a supporting plate upon which the operating mechanism is mounted and attaching it thereto, so that the supporting plate does not require an indicating scale being formed directly thereon, but can be fabricated in any way most suitable to attaching thereto the various parts of the mechanism, and securing the thermometer in operative position.

A further object of the invention is to afford a simple arrangement for locating and mounting an indicating scale on the supporting plate.

Still an additional object of the invention is to afford a simple and improved structure for attaching a cover to a supporting plate, and to utilize the indicating scale or plate for yieldably maintaining a protective transparent member in a window of the cover opposite the scale and indicator, so that the glass or other transparent material of the protecting member may not be damaged by excessive heat changes, as where it is held rigidly in place.

To these and other ends, the invention consists in the construction and arrangement of parts that will appear clearly from the following description when read in conjunction with the accompanying drawings, the novel features being pointed out in the claims following the specification.

In the drawings:

Fig. 1 is a vertical sectional view illustrative of one practical embodiment of the invention in its application to a stove thermometer;

Fig. 2 is an enlarged horizontal sectional view on the line 2—2 of Fig. 1 looking in the direction indicated;

Fig. 3 is a horizontal sectional view on the line 3—3 of Fig. 1 looking in the direction indicated;

Fig. 4 is a horizontal sectional view on the line 4—4 of Fig. 1 looking in the direction indicated;

Fig. 5 is an enlarged detail sectional view in the same plane as Fig. 4;

Fig. 6 is a view in front elevation;

Fig. 7 is a view in side elevation showing the thermometer as applied to a top wall of a stove;

Fig. 8 is a front elevation of the device with the cover removed;

Fig. 9 is a side elevation with the cover removed;

Fig. 10 is an enlarged top plan view, with the cover in section;

Fig. 11 is a side elevation of a retaining device that may be used for holding the thermometer in place on a stove;

Fig. 12 is a plan view of the same;

Fig. 13 is a plan view of the supporting plate, and

Fig. 14 is a detail sectional view on the line 14—14 of Fig. 10.

It is to be understood that while the present disclosure shows an installation of the thermometer in a particular relationship on a stove, the device may be variously applied to other parts or in other positions, or may be used independently of a stove by merely changing the location and relation of the temperature responsive element, and referring more particularly to the drawings in which like reference numerals refer to the same parts throughout the several views, the parts are mounted upon a supporting plate that includes a marginal portion 1 and an upset central portion 2, these portions being joined by an inclined connecting portion 3 affording a shoulder for a purpose that will appear presently.

The supporting plate is of the shape appearing in Fig. 10, the inclined connecting portion 3 at the front of the supporting plate being arcuate endwise and affording a backing or bracing means for the bottom portion of the endwise curved dial or indicating plate 4 which rests against said inclined connecting portion or wall 3, as shown in Fig. 1. The dial 4 is part of the indicating plate that also includes an angular supporting portion or flange 5 that lies against the marginal portion 1 of the supporting plate and is riveted thereto at 6, or attached in any suitable fashion.

The indicating plate or dial 4 is provided with suitable indicia, as shown in Figs. 8, 9 and 10, which may be imprinted thereon in any convenient manner, and with this construction, the dial with the indicating marks thereon may be formed separately from the supporting plate so that the latter, which is preferably made of metal, may be fabricated in any desired way to attach most effectively and economically the various operating parts, and to secure it in operative position, and the supporting plate need not be formed with a porcelain or other surface to receive the graduated indicating scale as is the case in some structures of this character. In this respect, the invention is more economical to produce and more practical from a manufacturing and assembling standpoint. The indicating plate or dial 4, which is preferably of metal, is provided at its ends with the raised or forwardly pressed portions 7 for supporting a glass or transparent protecting member in the window of the cover in a manner that will now be described in more detail.

The cover is designated generally at 11, see Fig. 1, being of the same general contour as the supporting plate and including side walls 12 that extend downwardly around the edges of the supporting plate, the housing being secured to the latter by means of the inwardly bent lugs 13, see Fig. 14, which engage the adjacent outer surface of the supporting plate, the latter being held between the lugs 13 and projections 14 formed in the cover by upsetting the latter, said projections 14 acting to limit inward movement of the supporting plate and locate the latter in the cover.

The cover 11 is provided with a window 15 opposite the dial or indicating scale 4, and located in said window 15 is a protecting member 16 of glass or other transparent material through which the indicating dial can be read. The transparent protectng member 16 includes end portions that extend over the inner surfaces of the cover adjacent to the window, as shown in Fig. 2, to limit outward movement of the transparent member through the window, while 18 designates inwardly extending projections or lugs formed on the transparent member 16, see Fig. 2, and arranged to contact the forwardly bent portions 7 at the ends of the indicating dial or plate 4.

The indicating dial being free and unsupported above the inclined connecting portion or wall 3 of the supporting plate, has a certain amount of yieldability, sufficient to engage and hold the transparent member 16 through the lugs 18 in the window of the cover in a manner that permits slight contraction or expansion of the transparent member, thus obviating damage to the latter due to excessive temperature changes to which it may be subjected, and at the same time compensating for inaccuracies in fitting these parts and avoiding the necessity for additional instrumentalities to secure the transparent member in place.

The structure includes a pointer or indicator adapted to be actuated by a temperature responsive element and including an indicating portion 21 that is located parallel to the dial 4 and movable thereover, and a connecting portion 22 extending over the outer edge of the dial and thence inwardly to the attaching portion 23 that is secured fixedly to an indicator shaft 24, the latter extending transversely of the supporting plate and being journalled in a bearing 25 that is fixedly secured to the supporting plate in any suitable manner.

In the structure shown, the bearing 25 and the indicator shaft 24 extend through the supporting plate and outwardly beyond the same, although this specific arrangement is not essential to carrying out the purposes of the invention, as the indicator shaft and temperature responsive element to be described presently may be located within the housing formed by the supporting plate and cover if desired, the specific structure shown being intended for use in one application of the invention where it is applied to the top of a stove. In this construction, the bearing 25 is formed as part of a sleeve 26 that is rigidly secured within a tube 27, while 29 is a plug fixedly attached within the outer end of the tube 27 and provided with a post 31. 32 designates a temperature responsive element, here shown in the form of a bimetallic coil, having one end fixedly secured to the post 31 and its opposite end secured to the outer end of the indicator shaft 24.

The bimetallic coil may be attached to the indicator shaft 24 and to the post 31 by any suitable means, the specific form of connection constituting no part of the present invention, and in the illustrated structure, the indicator shaft 24 is provided at its end adjacent to the bimetallic coil with a flattened surface 33 provided by upsetting the shaft, see Fig. 5, and at the same time the shaft is upset to afford a lug 34 that extends through an opening suitably formed in the adjacent end of the bimetallic coil. After the lug 34 is inserted through the opening in the bimetallic coil, it is forced over the latter as shown at 35 in Fig. 5, and thus securely locks the adjacent portion of the bimetallic coil against the flattened surface of the indicator shaft 24, and it will be understood that the opposite end of the bimetallic coil is attached in similar fashion to the post 31.

The structure is illustrated as positioned upon the top wall 36 of a stove, see Fig. 7, 37 designating an interior wall of the stove, through which the tube 27 and indicator shaft 24 extend. With such an arrangement, there may be provided a convenient holder including a split sleeve 38 having inwardly extending lugs or projections 39 for frictionally engaging the outer surface of the tube 27, while 41 designates a retaining plate fixedly attached to the upper end of the sleeve 38 and provided with suitable openings 42 by which it may be secured to the top wall 36 of the stove. 43 designates an upwardly extending lug at the forward end of the plate 41, adapted to extend into an opening 44 provided in the supporting plate of the thermometer so as to properly locate the latter when it is positioned on the stove.

With this arrangement, the retaining sleeve 38 and attaching plate 41 are fixedly secured in place on the top wall of the stove, and the thermometer is then readily attachable by inserting the tube 27 into the sleeve 38 and forcing it downwardly against the yieldable gripping action of the spring lugs 39 while turning it to the proper position in which the lug 43 will enter the opening 44, as shown in Fig. 1.

This latter construction is not an essential part of the invention, as the thermometer may be otherwise arranged in a side wall or in the oven door of a range, or may be used independently of a stove structure, in which case the temperature responsive element and indicator shaft may be located entirely within the space afforded between the supporting plate and cover.

While the invention has been disclosed with reference to the particular embodiment shown, it is not confined to any particular arrangement, and this application is intended to cover such modifications or departures as may come within the intent of the improvements or the scope of the following claims.

I claim:

1. In a thermometer, the combination with a supporting plate including a marginal portion, an upset central portion, and an inclined connecting portion therebetween affording a shoulder, of a curved dial plate separate from the supporting plate and extending away from the latter in inclined relationship with its innermost portion resting against said shoulder, said dial plate including an angular attaching flange coextensive endwise with the dial plate and located parallel to and secured to said marginal portion of the supporting plate, said dial plate being inclined toward the rear of the supporting plate and said attaching flange extending toward the front of the supporting plate and secured between the inclined connecting portion and the front edge of the supporting plate, an indicator shaft journalled in the supporting plate and extending transversely thereof, a heat responsive element connected to the indicator shaft, and an indicator carried by said shaft and including an attaching portion, a connecting portion overlying the outer edge of the dial plate, and an inwardly extending pointer arranged parallel to and movable over said dial plate.

2. In a thermometer, the combination with a supporting plate, of an elongated curved separate dial plate extending away from the supporting plate in inclined relation thereto and having an angular attaching flange located against and secured to the supporting plate, said dial plate being inclined toward the rear of the supporting plate and said attaching flange extending toward the front edge of said supporting plate, an indicator shaft journalled in the supporting plate and extending transversely thereof, an indicator carried on said shaft and including a pointer located parallel to and movable over said dial plate, a temperature responsive element connected to said shaft, a cover secured to the supporting plate and having a window opposite said dial plate, and a transparent member located in said window and having terminal portions overlying the inner surface of the cover at points adjacent to the ends of said window, said terminal portions being provided with inwardly extending projections engaging the dial plate, which latter acts yieldably to hold the transparent member in place.

3. In a thermometer, the combination with a supporting plate including a marginal portion and an upset central portion, of an elongated curved, separate dial plate extending away from the supporting plate in inclined relation thereto and having an angular attaching flange secured against the marginal portion of the supporting plate, an indicator shaft journalled in the supporting plate and extending transversely thereof, a heat responsive element connected to the indicator shaft, an indicator carried by said shaft and including a pointer arranged parallel to and movable over said dial plate, and a one-piece cover including depending walls that surround the edges of the marginal portion of the supporting plate, said cover having inwardly upset portions that afford stops for limiting the inward movement of the supporting plate and inwardly bent lugs that overlie the outer surface of the supporting plate and retain it within the cover.

4. In a thermometer, the combination with a supporting plate including a marginal portion, an upset central portion and an inclined connecting portion therebetween affording a shoulder, of an elongated curved separate dial plate extending away from the supporting plate with its innermost portion resting against said shoulder, said dial plate including an angular attaching flange coextensive endwise with the dial plate and located parallel to and secured to said marginal portion of the supporting plate, the dial plate being inclined toward the rear of the supporting plate and said attaching flange extending toward the front of the supporting plate and secured between the inclined connecting portion and the front edge of the supporting plate, an indicator shaft journalled in the supporting plate and extending transversely thereof, an indicator carried by said shaft and having a pointer located parallel to and movable over said dial plate, a temperature responsive element connected to the indicator shaft, a cover attached to the supporting plate and having a window opposite said dial plate, and a transparent member located in said window and having terminal portions overlying the inner surface of the cover at points adjacent to the ends of the window, said terminal portions being provided with inwardly extending projections engaging said dial plate which acts yieldably to hold the transparent member in place.

GEORGE E. FORD.